(12) United States Patent
Lotze et al.

(10) Patent No.: US 8,983,795 B2
(45) Date of Patent: Mar. 17, 2015

(54) METHOD FOR MEASURING A WORK PIECE, CALIBRATION METHOD AND COORDINATE MEASURING DEVICE

(75) Inventors: Werner Lotze, Dresden (DE); Steffen Kunzmann, Dresden (DE); Tobias Held, Nördlingen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 512 days.

(21) Appl. No.: 13/122,282

(22) PCT Filed: Sep. 17, 2009

(86) PCT No.: PCT/EP2009/006927
§ 371 (c)(1),
(2), (4) Date: Apr. 1, 2011

(87) PCT Pub. No.: WO2010/037506
PCT Pub. Date: Apr. 8, 2010

(65) Prior Publication Data
US 2011/0191060 A1 Aug. 4, 2011

(30) Foreign Application Priority Data

Oct. 1, 2008 (DE) .......................... 10 2008 049 751

(51) Int. Cl.
*G06F 15/00* (2006.01)
*G01B 21/04* (2006.01)

(52) U.S. Cl.
CPC .................................... *G01B 21/042* (2013.01)
USPC ........................................................ 702/150

(58) Field of Classification Search
USPC ........................................................ 702/150
See application file for complete search history.

(56) References Cited

U.S. PATENT DOCUMENTS 3,806,801 A * 4/1974 Bove ............................ 324/72.5
3,943,633 A 3/1976 Ruffner (Continued)

FOREIGN PATENT DOCUMENTS

DE 19518268 A1 11/1995
EP 1279918 A2 1/2003

(Continued)

OTHER PUBLICATIONS

Bharat Bhushan and Othmar Marti, Scanning Probe Microscopy—Principle of Operation, Instrumentation, and Probes, 75 pages, http://www.springer.com/978-3-642-15282-5, 2011.*

(Continued)

*Primary Examiner* — Tung S Lau
(74) *Attorney, Agent, or Firm* — Laurence A. Greenberg; Werner H. Stemer; Ralph E. Locher

(57) ABSTRACT

A work piece is measured by at least one point of a surface of the work piece being sampled by a feeler. The feeler exerts a probing force on the surface and the feeler is deflected relative to a mounting of the feeler. On the basis of the deflection, a position of the point of the surface is determined. A directional dependence of a flexibility of the feeler is determined and/or is known. The feeler and the work piece are positioned and/or oriented relative to each other, while taking into consideration the directional dependence, such that during sampling of the point of the surface unintentional slipping of the feeler on the surface does not occur, or occurs only with low probability, or an unintentional deviation of the feeler from an intended path on the surface does not occur, or occurs only with low probability.

19 Claims, 6 Drawing Sheets

(56) References Cited

U.S. PATENT DOCUMENTS

| | | |
|---|---|---|
| 4,621,434 A | 11/1986 | Hirschmann |
| 4,882,848 A | 11/1989 | Breyer et al. |
| 5,040,306 A | 8/1991 | McMurtry et al. |
| 5,610,846 A | 3/1997 | Trapet et al. |
| 5,806,201 A | 9/1998 | Feichtinger |
| 5,966,681 A | 10/1999 | Bernhardt et al. |
| 2005/0190999 A1 | 9/2005 | Hunter et al. |
| 2008/0148588 A1 | 6/2008 | Yoshizumi et al. |
| 2009/0025463 A1 * | 1/2009 | McFarland et al. ............. 73/104 |

FOREIGN PATENT DOCUMENTS

| | | | |
|---|---|---|---|
| EP | 1602900 A2 | 12/2005 | |
| WO | WO 2006/114567 | * 11/2006 | ............. G01B 21/04 |

OTHER PUBLICATIONS

Miguel et al: "A Review on Methods for Probe Performance Verification", Institute of Measurement and Control, vol. 23, No. 1, Jan. 1, 1998, pp. 15-33, XP004129957, London, Great Britain.

* cited by examiner

METHOD FOR MEASURING A WORK PIECE, CALIBRATION METHOD AND COORDINATE MEASURING DEVICE

BACKGROUND OF THE INVENTION

Field of the Invention

The present invention relates to a method for measuring a workpiece, and a corresponding coordinate measuring device. The present invention furthermore relates to a calibration method for calibrating a probe. The present invention relates in particular to the field of coordinate metrology using a coordinate measuring device which has a sensor with a deflectable probe (in particular with a probe pin), at whose free end a probe body (generally a probe ball) is arranged, which probes the workpiece to be measured.

In coordinate metrology, sensors (in particular probe heads) are frequently used in which a probe pin is attached to the sensor such that it can move in the three coordinate directions of a Cartesian coordinate system. For this purpose, known sensors have a mechanism in their interior, by means of which the probe pin can be deflected in the three coordinate directions. For this purpose, the mechanism normally has three guides, with each of the guides allowing movement in one of the three coordinate directions of the coordinate measuring device. For this purpose, each of the three guides is aligned parallel to one of the movement directions of the coordinate measuring device.

The publication entitled "Messende Taster mit mehreren Freiheitsgraden" [Measuring probes with a plurality of degrees of freedom] by Werner Lotze, TR Technische Rundschau, Issue 29/30, 1993, pages 20-25 describes a model of derivation of the response of a measuring probe with three degrees of freedom. According to the model, the probe has three crossed-over spring parallel guides and associated measured-value sensors. The spring guides are designed such that they each have a linear spring characteristic, with given flexibility, in the three directions. All three guides can move freely, thus allowing the probe ball which is attached to the probe pin to be deflected in each spatial direction. When probing a workpiece surface, the forces which are exerted on the probe ball by the workpiece surface can be described as a measurement force vector f, which deflects the probe pin and the probe system of the probe equally. The deflection can in turn be described by a vector, the deflection vector a, which is equal to the vectorial sum of the movement vector of the probe clamp and the deformation vector of the probe pin. The model assumes strict linearity between the measurement force and the probe deflection on the one hand, and between the probe deflection and the measurement signals on the other hand. The relationship between the deformation vector v and the force vector f is expressed by a flexibility matrix N, which is a 3×3 matrix.

In order to understand this relationship, the deflection can be followed for the situation in which a force vector f with a constant magnitude, which can be normalized with respect to the value 1, passes through all the spatial directions. The vector f then describes a unit sphere. The totality of all the deflection vectors v then describes a spatial ellipsoid, which can be referred to as the influence or flexibility ellipsoid. The direction of the measurement force f and of the deformation vector v of the probe pin coincide only in the three major axis directions of this ellipsoid. These axis directions are at the same time the three Eigen vectors of the flexibility matrix $N_T$.

The deflection s of the probe clamp (with respect to the probe ball center point) can all be described as a vector equation, with the deflection vector s being the same as the flexibility matrix $N_F$ resulting from the measurement springs, multiplied by the measurement force vector f. The total deflection a can thus be expressed as a vector, as the sum of the deflection vector s and of the deformation vector v of the probe pin. A total flexibility matrix $N_{tot}$ can accordingly be defined, which is equal to the sum of the flexibility matrix $N_T$ relating to the deformation of the probe pin and the flexibility matrix $N_F$ resulting from the measurement springs.

The cited publication also derives the relationship between the deflection vector s of the probe clamp and the total deflection vector a, in that the vector a multiplied by a matrix M, which is referred to as the elastic transmission matrix, is equal to the vector s. The three output signals u1, u2, u3 of a probe with respect to the three coordinate axes are available primarily as a measurement variable of the probe. These output signals can be described as a vector u. This vector u is equal to the deflection vector s of the probe clamp multiplied by a transmission matrix B. The product of this transmission matrix B and of the elastic transmission matrix M can be inverted, thus resulting in a so-called probe matrix K. The nine coefficients of this matrix K contain all the kinematic, elastic characteristics of the probe which are relevant for producing the signals. It is normal practice to determine these coefficients by special calibration using a calibration standard. The position of the current measurement point can be calculated with the aid of the probe matrix K from the instantaneous position details relating to the probe ball, produced by the coordinate measuring device, and from measurement signals from the probe, that is to say the position of the point at which the probe ball touches the workpiece surface. One significant factor in this formulation of the problem is that the measurement force occurs neither on the basis of magnitude nor direction. In consequence, to a first order, it is irrelevant to the measurement process. A corresponding situation applies to the elastic characteristics, and therefore to the flexibility matrix resulting from the deformation of the probe pin. As long as this model is correct, one calibration is sufficient to allow determination of the coordinates of the measurement point without further consideration of the flexibility and measurement force.

However, the model described above is subject to the precondition that the measurement force vector f passes through the center point P of the probe ball. However, in fact, the measurement force relating to the probe ball acts on the probe ball surface at the contact point B and in the process is generally at a distance from the center point P of the probe ball, as a result of which, not only do the lengths of the lever arms for the flexure of the overall elastic system change, but a torque is also produced about the center point P. With normal probe balls with a diameter of a few millimeters, the error is negligibly small for many measurement tasks. However, there are also situations in which the error is significant, particularly if the deformation v of the probe pin is large. It is not always possible to avoid this by, for example, using an appropriately stiff probe pin.

In practice, probe pins are used whose flexibility is very different in the three coordinate directions. By way of example, the flexibility in one direction may be ten times greater than in another direction.

BRIEF SUMMARY OF THE INVENTION

One object of the present invention is to increase the accuracy of determination of coordinates of a workpiece by mechanical probing of the workpiece surface with a probe.

In order to achieve the object, it is proposed that the elastic characteristics of the probe be taken into account in the calibration and/or during operation of the coordinate measuring device. In contrast to the article mentioned above and published in TR Technische Rundschau, Issue 29/30, 1993, pages 20-25, the elastic characteristics are intended to be explicitly taken into account, and not simply eliminated by calibration of the probe for measurement operation.

According to a first aspect of the invention, which can be implemented independently of further aspects which are still to be described, in the case of probes which have at least one rotational degree of freedom of movement (for example a probe having a probe element which is connected to the arm of a coordinate measuring device via a universal joint—or a similar mechanism which allows rotation about at least one rotation axis—or a probe with a probe pin attached to a platform, with the platform being connected to the coordinate measuring device via two parallel leaf springs, which are separated from one another, as is illustrated in FIG. 4 of the publication cited above from Technische Rundschau), flexibility (also referred to in the following text as elasticity) of the probe is taken into account resulting from the possible elastic movement of the joint (for example universal joint) in probes such as these, with respect to an attachment of the probe. In this description, a universal joint in general means a mechanism which allows the probe element to rotate about two rotation axes which are at right angles to one another. The movement occurs in particular as a result of the measurement force, that is to say as a result of the probing of the workpiece by the probe. A joint means the mechanism which allows the rotational degree of freedom, for example said universal joint or a mechanism which has only a single rotating bearing for bearing a part which can rotate about one rotation axis, with the probe pin being mounted, for example, on the part which can rotate.

The attachment for the probe is arranged, for example, on an arm of a coordinate measuring device, with the arm having at least one degree of freedom of movement. The wording "taking account of the flexibility" includes taking account of the direction dependency of the flexibility, that is to say the fact that the probe or a probe head whose part is the probe has different flexibility in different directions.

In the same manner as in the case of probes with joints, the elasticity of the measuring device can also be taken into account for other probes which have at least one rotational degree of freedom of movement. For example, a probe may be elastically deformable under the influence of an external force and/or the movement of the probe element can be measured, for example by means of strain gauges. The rotational movement can also be detected by evaluation of the signals from a plurality of strain gauges. The invention is therefore not restricted to taking account of the flexibility of probes with joints (for example a universal joint). In fact, the at least one rotational degree of freedom may also exist as a result of a different mechanical design, in which, for example, a linear movement can also be coupled to a rotational movement. This is the case, for example, for the probe which will also be described with reference to FIG. 7, or for the SP25 probe from Renishaw plc, New Mills, Wotton-under-Edge, Gloucestershire, GL12 8JR, United Kingdom.

In all cases, the elasticity is preferably taken into account by using flexibility matrices.

According to a second aspect of the invention, which can be implemented individually or in combination with one or more of the other aspects of the invention, the elasticity, in particular the flexibility matrix, of the probe is determined using a physical model and/or by experiments. The flexibility matrix is preferably used later for planning and/or control of the measurement, when measuring a workpiece with the aid of the probe. In particular, a direction and/or force with which the probe probes the surface of the workpiece is predetermined using the elasticity calculated by the model and/or the elasticity determined by experiments.

Where this description or the patent claims refer to the flexibility matrix as a description of the direction-dependent elasticity of a probe or of another coordinate measuring device, this also includes the situation in which other, equivalent formulations of the flexibility matrix are used or determined, for example the flexibility ellipsoid (see above), the inverse of the flexibility matrix, also referred to as the stiffness matrix, or some other formulation.

In particular, the flexibility matrix may already be known before calibration of the probe, in order to carry out the calibration more precisely (or at least individual elements of the matrix may be known, or estimated values may be available or determined for the elements or the matrix). One example for the actual calibration of a probe is described in WO 2004/106854 A1, whose entire contents are referred to. In this case, the flexibility matrix known before the calibration can be improved by the calibration, that is to say the process for determining the flexibility matrix is carried out iteratively. In this case, further iterations can be carried out, that is to say another calibration can be carried out after an initial improvement of the flexibility matrix by a calibration, thus once again improving the flexibility matrix. Further iteration steps such as these are possible.

The flexibility matrix can therefore be used exclusively to improve the calibration. However, alternatively or additionally, the flexibility matrix can be used directly for the planning and/or control of the measurement of a workpiece. Examples relating to this are also described in more detail. In this case, this also results in examples from other aspects of the invention, which can be implemented independently of this second aspect of the invention.

In particular, the following is proposed: a method for determining direction-dependent flexibility of a probe, which is designed to mechanically probe the surface in order to determine coordinates of surface points of a workpiece, in particular for determining direction-dependent flexibility of a probe having at least one rotational degree of freedom of movement while probing the surface, wherein
a plurality of surface points on a workpiece are probed by the probe, and a deflection a of the probe is detected for each of the surface points on the basis of a probe force which acts while probing,
elements of a flexibility matrix $N_{tot}$, which describes the direction-dependent flexibility, are calculated taking account of the vector equation which is applicable for each of the probed surface points:

$$a = N_{tot} f$$

where f is the opposing force which the surface point exerts on the probe against the probe force.

In particular, all the elements of the flexibility matrix can be determined. In one preferred embodiment, a multiplicity of the surface points are probed, an overdefined equation system is created which contains the vector equation, as mentioned above, for each of the surface points, and the equation system is solved. For example, best fit methods can be used to determine the elements of the flexibility matrix from the equation system.

In the case of the method, trials can be used for at least some of the probed surface points to determine the direction in which the deflection vector of the probe element is oriented when the probe force is at right angles to the surface. This direction is the direction of the center axis of the so-called friction cone. By way of example, starting from a state in which the probe element is probing the surface with a probe force, the deflection direction can be changed during the experiments by the coordinate measuring device moving the probe until the probe element slides on the surface, that is to say the probe element no longer touches the surface at the same point.

When calculating the elements of the flexibility matrix (in particular using the equation system mentioned above), the direction of the center axis of the friction cone determined in this way can be taken into account as the direction of the deflection vector and, in particular, the respective surface point can also be probed with this direction of the deflection vector.

In particular, the flexibility matrix can be calculated from the same measurement points which have to be probed for sensor calibration. One example of this is also described in the description of the figures.

If the flexibility matrix has been determined by experiments, there should preferably be no significant differences from the flexibility matrix which was used for carrying out the experiments, in particular for the calibration of the probe. A limit value is preferably predetermined. If elements and/or criteria which have been calculated from elements of the flexibility matrix before and after the experiments differ from one another by a value which is greater than the limit value, the calibration can be rejected and repeated (in particular a further iteration step can be carried out, as mentioned above), and/or the calibration can be used only with reservations for the measurement of a workpiece.

The following idea is independent of the way in which the flexibility matrix is determined. However, the flexibility matrix can be determined first of all in one of the described ways, and a calibration of a probe can then be carried out, or information for the calibration and the determination of the flexibility matrix can be obtained at least partially in joint experiments (in particular by probing a workpiece, for example a calibration object, with the probe).

During the calibration of a sensor (probe), the calibration points can be recorded using the scanning method, that is to say the probe element of the probe is moved along the surface of the calibration object while the probe element is exerting a probe force on the surface. During the process, the probe element is moved backward and forward, preferably with a constant nominal probe force, on the same path on the surface of the calibration object since systematic errors can otherwise occur in the determination of the flexibility matrix, and in most cases will also occur.

If the scanning method is not used for calibration, information which eliminates systematic errors in the determination of the flexibility matrix can be gathered by variation of the nominal probe direction of the probe element for each probed surface point on the calibration object.

According to a third aspect of the invention, which can be carried out individually or in any desired combination with the other aspects, the probe force is used directly as an open-loop or closed-loop controlled variable for open-loop and/or closed-loop control of a probe process (that is to say a process in which a probe element of a probe probes a workpiece surface for the purpose of measuring the workpiece). Until now, it has been normal practice to provide open-loop and/or closed-loop control of the nominal force only indirectly via the deflection of the probe element with respect to an attachment of the probe element. The user, that is to say the operator, of a coordinate measuring device in many cases presets a probe force, rather than the deflection, however. Until now, it has likewise been normal practice to preset the magnitude of the probe force and to apply the force to the probe point at right angles to the surface of the workpiece. Because the elastic characteristics of the probes are not isotropic, as mentioned above, this can, however, lead to the probe element sliding away or sliding through on the surface of the workpiece. If a workpiece surface is scanned using the scanning method, considerable discrepancies can occur from the path which is actually scanned when scanning the surface of the workpiece, in comparison to the path which is intended to be scanned. Particularly if the scanning path lies on a nominal plane, this may be disadvantageous.

The use of the flexibility matrix allows direct open-loop and/or closed-loop control of the magnitude and direction of the probe force. In particular, it is possible to check whether the probe element can slide through when a nominal probe force is applied. If this is the case, the open-loop and/or closed-loop control can automatically select a different force, and/or output a message to the operator.

Alternatively or additionally, as will also be described in more detail with reference to the fourth aspect of the invention, the orientation of the flexibility ellipsoid of the probe can also be varied relative to the workpiece, in particular being varied such that the probe element does not slide through on the workpiece surface when the magnitude of the measurement force is the same or even when the measurement force is the same (in terms of magnitude and direction). For example, in the case of a probe having a universal joint and/or in the case of a probe having one or more rotational degrees of freedom, for example a probe which is suspended on a rotating/pivoting joint, said desired effect can be achieved by suitable adjustment of the probe suspension.

As an alternative to direct use of the probe force for open-loop and/or closed-loop control, it is also possible to use the deflection for open-loop and/or closed-loop control, in which case, however, the flexibility matrix is used to calculate limits for the alignment of the probe with respect to the workpiece surface, and/or limits for the magnitude of the probe force.

In particular, it is possible for the open-loop and/or closed-loop control, which uses the deflection, to calculate the flexibility matrix or at least elements of it using the nominal deflection. However, the use of the deflection as an open-loop/closed-loop controlled variable for open-loop and/or closed-loop control is not preferred even though, for example, the problems mentioned above (sliding away) during scanning can likewise be solved in this way.

A further, fourth aspect of the invention, which can be implemented on its own or in any desired combination with one of the other aspects, is described in the following text.

A preferred procedure for probing a workpiece surface is possible in particular in both cases of closed-loop and open-loop control (measurement force or deflection as the open-loop/closed-loop controlled variable). As mentioned above, users frequently expect the measurement force to be applied at right angles to the surface of the workpiece. It will therefore be surprising for the user if the probe element were not to be moved toward the workpiece surface at right angles to the surface in a manner which he could clearly see but, for example, moved on a curve. The approach to the surface at right angles is frequently specified as being necessary because the measurement of the workpiece is planned in advance with the aid of a model of the workpiece (for example a CAD model), and is transferred to the coordinate measurement device control system.

In order nevertheless to allow the measurement force to be applied to the workpiece surface in the optimum direction calculated with the aid of the flexibility matrix (and furthermore, of course, to allow it to be applied to the workpiece surface at the desired point), it is proposed that the probe element first of all be moved toward the desired probe point at right angles to the surface, and that this first probe movement be ended at a point at a distance from the workpiece surface or alternatively that the desired probe point be approached such that the probe element comes into contact at the probe point, but the direction be then changed for the further remaining movement until the probe element reaches the workpiece surface, to be precise in the direction of the desired deflection direction, or (if the probe element has already reached the workpiece surface by approaching it vertically) for the probe element to be deflected in the direction of the desired deflection direction. In particular, the probe force is thus applied (virtually) at right angles to the surface.

In particular, a method is proposed for measuring a workpiece, wherein at least one point on a surface of the workpiece is probed by a probe of a probe head, wherein the probe exerts a probe force on the surface and the probe is deflected relative to an attachment of the probe head. A position of the point on the surface is determined on the basis of the deflection. Direction dependency of flexibility of the probe and/or of the probe head is determined and/or is known. The direction dependency is used to calculate a deflection direction in which the probe is deflected while probing the surface, while it exerts the probe force on the workpiece. The probe is first of all moved towards the surface, at right angles to the surface, and the probe is then moved to the surface in an opposite direction to the deflection direction, or—if the probe has already been moved at right angles as far as the surface—the probe is deflected in the deflection direction.

Preferably, the deflection direction is calculated such that the probe force is at right angles to the surface. In this case, however, it should be noted that the calculation can be carried out in advance only with respect to a nominal probe point. The probe point can thus actually be probed with a probe force which is not exactly at right angles, in particular when the normal to the surface is aligned in a different manner to that predetermined by the nominal state.

According to a fifth aspect of the present invention, which can be implemented independently of the other aspects of the invention or in any desired combination with the other aspects of the invention, it is proposed that the flexibility ellipsoid of the probe be set taking account of the elastic characteristics of the probe with respect to the workpiece to be probed. "Setting" means that the workpiece and the probe are positioned and aligned relative to one another such that this results in the desired orientation of the flexibility ellipsoid when the probe element probes the workpiece surface.

In principle, there are two setting options, which can both be implemented on their own or in combination with one another. On the one hand, the position and/or orientation of the workpiece in space can be set in order to set the flexibility ellipsoid, for example by adjusting a pivotable holder of the workpiece and/or a turntable on which the workpiece is positioned. On the other hand, the probe can be adjusted in particular by varying the alignment of a probe pin at whose free end the probe element is located, and/or by adjusting the position and/or alignment of a universal joint which does not have isotropic elastic characteristics and to which the probe element is fitted, and/or by adjusting a rotating/pivoting joint to which the probe element is fitted. A corresponding situation applies, of course, to any other mechanism which allows the position and/or orientation of the probe element to be adjusted with respect to the workpiece.

The flexibility ellipsoid is preferably set such that the direction of the probe force does not coincide with the direction of the stiffest major axis of the flexibility ellipsoid. This is because, if this were to be the case, it is most probable that the probe element would slide through. Admittedly, it would not slide through if the stiffest major axis when probing were to coincide precisely with the direction of the probe force. However, this is an unstable equilibrium state. As soon as the direction of the probe force deviates slightly from the direction of the stiffest major axis, the probe will slide.

By way of example, the direction of the probe force is thus adjusted such that it coincides with another major axis, preferably the least stiff major axis, that is to say the most elastic major axis of the flexibility ellipsoid of the probe. Sliding through is virtually precluded in this case. This is particularly advantageous, especially during scanning, as will also be explained (stick-slip effects).

In particular, a method is proposed for measuring a workpiece, with at least one point on a surface of the workpiece being probed by a probe of a probe head. The probe exerts a probe force on the surface, and the probe is deflected relative to an attachment of the probe head. A position of the point on the surface is determined on the basis of the deflection. In this case, the deflection can be measured and/or the deflection (as is the case with probe heads of the so-called switching type) can lead to a signal being produced which initiates the determination of the coordinates of the point. The probe deflection may be of a different type. In principle, all types of deflection may be used which are possible for probe heads of coordinate measuring devices. As described initially, the deflection is frequently produced and measured by means of a plurality of linear guides on the various coordinate axes of the probe. However, deflection in the form of pivoting of the probe about a rotation axis or about a plurality of rotation axes is possible. Certain degrees of freedom of the movement (rotational or linear degrees of freedom) may be blocked for deflection. According to the proposal described here, a direction dependency of elasticity of the probe and/or of the probe head is determined, and/or the direction dependency is known. The probe and the workpiece are positioned and/or aligned relative to one another, taking account of the direction dependency, such that there is no probability or only a low probability of the probe inadvertently sliding on the surface, or there is no probability or a low probability of the probe inadvertently departing from an intended path on the surface, when probing the point on the surface.

With regard to the direction dependency of the elasticity, reference is made in particular to the direction dependency formulation options already described and those which are still to be described. In particular, elements of a flexibility matrix of the probe and/or of the probe head may be determined or known.

The positioning and/or alignment of the probe and of the workpiece relative to one another include/includes either the probe or the workpiece being positioned and/or aligned fixed, in such a way that it is in each case possible to vary the position and/or alignment only of the other object (that is to say the workpiece or the probe). However, it is also possible to move both objects in order to achieve the desired alignment and/or position.

Inadvertent sliding (which can also be referred to as sliding through) and inadvertent departure of the probe from an intended path have already been mentioned. The method is suitable both for measuring a workpiece by a single, separate probing of surface points, and for scanning methods.

Particularly when using probes in the scanning mode, so-called stick-slip effects are often observed, that is to say the probe element which is applying the probe force to the surface of the workpiece to be scanned repeatedly remains attached or "stuck" to the surface of the workpiece for a short time, followed by a time interval in which the probe element follows the planned scanning path at a correspondingly higher speed. These stick-slip time intervals frequently alternate at a high frequency. This can also be referred to as juddering. Stick-slip effects are exacerbated by rough surfaces and by oscillations being excited by the coordinate measuring device and/or parts of the probe.

In a "stick" phase, in which the probe element remains stuck or adheres to the surface, the probe force vector is within the friction cone, but in the subsequent "slip" phase, the force vector leaves the friction cone, that is to say its direction is inclined more sharply with respect to the center axis of the friction cone than the inclination of the friction cone limit lines.

According to one basic idea of the present invention, taking account of the direction dependency of the flexibility matrix, the alignment of the flexibility ellipsoid and the normal to the surface of the probed workpiece surface can be set relative to one another such that the probe force vector does not repeatedly leave the friction cone, and reach it again, or does so with a lower probability. In this case, it should be noted that, during scanning, both the friction cone orientation and the friction cone angle are in some circumstances subject to major changes. These changes are caused by the position dependency of the static friction coefficient and the change in the alignment of the workpiece surface relative to the probe, which generally occurs at least when the surfaces are uneven.

In particular, it is possible, with regard to the occurrence of "stick" effect, to identify poor alignments of the probe in advance and/or while scanning. Particularly if the probe or the workpiece can be rotated, it is possible to at least partially avoid such "stick" effects.

For example, when the flexibility ellipsoid is oriented during scanning such that the probe force vector runs in the direction of the shortest (that is to say the stiffest) axis of the flexibility ellipsoid, this results in a poor operating state in which "stick" effects occur frequently and/or particularly severely.

The probe element of the probe is frequently attached to an elongated element, the probe pin shank. At least a portion of the shank to which the probe element is directly attached is generally straight, that is to say it has a longitudinal axis which runs in the direction straight to the probe element. When the probe element is drawn over the workpiece surface during scanning such that the force component which is responsible for maintaining the scanning movement runs at least partially away from the probe element in the longitudinal direction of the shank, "stick" phases are less probable, or of shorter duration, and/or depart to a lesser extent from the mean scanning rate. This state is referred to as "pulling" the probe. The opposite situation, in which the force component which is responsible for maintaining the scanning movement and which the coordinate measuring device exerts on the probe element, can be referred to as "pushing". During pushing, the force component runs toward the probe element in the longitudinal direction of the shank. When the probe is being pulled, the stiffness of the probe increases in the tangential direction with respect to the surface of the workpiece up to the point at which the force vector leaves the friction cone. In the ideal, the force vector then remains permanently outside the friction cone, that is to say "stick" phases do not occur, in which the probe element remains stuck to the surface. In contrast, when the probe is pushed, the stiffness of the sensor decreases in the tangential direction. In the phase which immediately follows this, the probe element travels over a relatively long distance on the surface in a short time, as a result of which the probe force vector returns into the friction cone, and sticking occurs.

Although experienced users of probes know that pulling of probes is preferable to pushing, no objective criterion is available to them as to how to set the inclination of the shank with respect to the normal to the surface.

For example, a limit for the stiffness ratio can thus be predetermined (that is to say the ratio of the stiffness in a first direction to that in a second direction at right angles to the first). If the predetermined limit is exceeded, the way in which the flexibility ellipsoid can be aligned relative to the surface of the workpiece during scanning is calculated using information about the direction dependency of the flexibility of the probe (in particular using the flexibility matrix).

For example, it is possible to define a solid angle range around the stiffest axis of the flexibility ellipsoid (for example the solid angle range includes all the directions which differ from the stiffest axis by less than a predetermined angle magnitude of, for example, 20°). The scanning can be automatically planned and/or carried out by the coordinate measuring device control system such that the probe force vector does not reach this solid angle range (at least with respect to the nominal state of the workpiece, the actual state is in fact in general not yet known). In the calculation process, it can be assumed that the surface of the workpiece is ideally smooth. The number of "stick" phases for real workpieces is thus nevertheless at least reduced.

The considerations described above can also be transferred to situations in which neither the workpiece nor the probe can be rotated, in order to align the flexibility ellipsoid relative to the surface. In this case, the planning and/or control of the scanning may have a scanning rate limit value (that is to say the magnitude of the rate), which must not be exceeded. In this case, the limit value may vary during the scanning process, depending on the conditions which are expected on the surface of the workpiece. The scanning rate means the relative velocity of the probe element and the surface of the workpiece. If consideration of the flexibility matrix is restricted to planning, the limit value for the scanning rate can only be calculated and output for example as a proposal for the user.

Since the actual state of the workpiece is in general unknown prior to scanning, the influence of rough surfaces, which is poor in terms of the "slip-stick" effect, can be taken into account by means of an effective static friction coefficient averaged over the surface. A friction cone with a corresponding cone angle corresponds to an effective coefficient such as this.

During scanning, it is possible to identify (by an evaluation of the fluctuation over time of the measurement sensor signals from the probe and/or by means of an additional sensor, which is independent of the measurement functions and detects juddering) whether and/or when stick-slip effects occur. Depending on whether a predefined criterion is satisfied (for example the frequency of the slip-stick change reaches or exceeds a predetermined frequency limit value), measures can be taken, for example a warning can be output, the speed can be reduced or a speed reduction can be recommended, and/or a different alignment angle can be selected for the flexibility ellipsoid.

In an entirely general form, it can be said for the present invention that the invention can be used particularly advantageously for so-called passive sensors or passive probes, that is to say for probes which do not have measured value transmitters which directly measure the force acting during probing.

Passive sensors in fact contain measured value transmitters which measure the deflection and allow the force to be calculated only indirectly, for example via known spring constants relating to the elastic deflection.

In summary it can be stated that, using the flexibility matrix, the following additional measures can be taken:

a) The cone angle of the friction cone can be calculated in the force vector space from the stick-slip effects which occur, or during the planning of a scanning process.

b) In particular, signals from measured value transmitters of the probe, or data derived therefrom, can be filtered during the scanning process. For example, the forces which were calculated from the deflections with the aid of the flexibility matrix are stored for each measurement point during the scanning process. Each measurement point at which the probe force with respect to the surface approaches the calculated friction cone angle on the basis of a predefined criterion is marked as invalid. If the number of measurement points marked as being invalid becomes too great, measures can be taken, such as a speed reduction or the output of a warning.

c) If the probe and/or the workpiece can be rotated or the relative alignment of the workpiece and probe can be adjusted by linear movement at least of the workpiece or of the probe suspension, the flexibility ellipsoid of the probe can be aligned in a suitable manner with the workpiece surface.

d) For example, the friction cone obtained with the aid of the flexibility matrix can be stored and/or can first of all be combined with other parameters of the measurement, and can then be stored. The stored information can be accessed during subsequent scanning.

Instead of referring to flexibility, it is also possible to refer to elasticity. In both cases, this means that reversible deformation and/or deflection occurs when a force is exerted on the probe and/or probe head, as is the case, because of the opposing force, when probing a surface point. The greater the elasticity or flexibility is, the greater is the deformation and/or deflection for a given force.

In particular, the workpiece can be rotated taking account of the direction dependency of the flexibility. For example, it is normal practice to use turntables, on which the workpiece to be measured is arranged, for coordinate measuring devices. When the turntable with the workpiece is rotated, this allows the normal to the surface through a measurement point on the surface of the workpiece to be aligned differently, and in general also to be positioned differently.

Alternatively or additionally, it is proposed for the probe to be able to rotate about at least one rotation axis, taking account of the direction dependency. For example, the probe head may have a rotating/pivoting joint, or may be connected to a holder for the coordinate measuring device via a joint such as this. In this case, the rotating/pivoting joint is operated so as to achieve a desired position and/or alignment of the probe relative to the workpiece.

In more general terms, a control system for the coordinate measuring device, in particular, to which the probe is fitted can take account of the direction dependency of the flexibility of the probe and can calculate an alignment and/or position of the workpiece and of the probe relative to one another. In this case, it is also possible to take account of further factors in addition to the direction dependency, specifically in particular geometric constraints, which allow the probe to be used only in a restricted solid angle range when probing a specific surface area of the workpiece.

In particular, static friction coefficients and/or sliding friction coefficients for probing of the workpiece by the probe can be taken into account in the calculation of the relative position and/or alignment of the probe and of the workpiece. In particular, coefficients such as these or corresponding physical models can be taken into account to calculate the probe force which leads to sliding through or departure of the probe on the workpiece surface.

Alternatively or in addition to the direction and/or position of the probe and workpiece, a rate at which the probe is moved along the surface of the workpiece can be calculated in particular for scanning measurements. In particular, a maximum rate value can be calculated, at which the probe does not yet inadvertently depart from the intended scanning path.

In all cases in which the direction dependency of the flexibility of the probe and/or probe head is taken into account for planning and/or controlling the measurement of a workpiece, the result of taking these factors into account may be a limit value, or the result of the calculation may be limit values, with the limit value or the limit values being applicable to operation of the coordinate measuring device and for carrying out the method. Examples of limit values are limits of spatial regions or solid angle ranges, in which case the solid angle ranges relate, for example, to a preferred direction of the workpiece or of the probe and/or a maximum value of the scanning rate, or the acceleration of the probe when scanning.

Exemplary embodiments of the invention will now be described with reference to the attached drawing. In the individual figures of the drawing:

DESCRIPTION OF THE INVENTION

Figure 1:
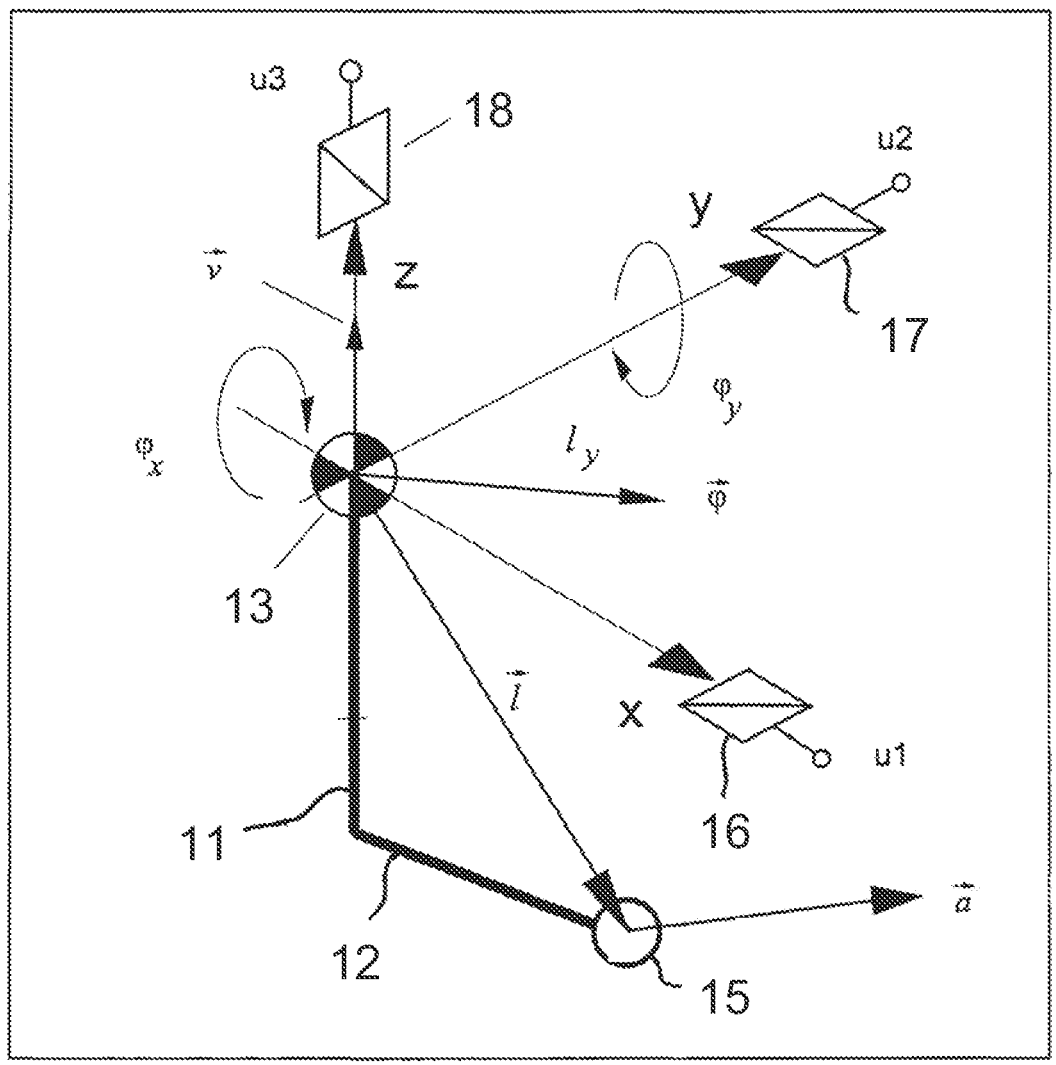
FIG. 1 shows a kinematic model of a probe with a universal joint.

FIG. 1 shows schematically a probe pin 11 with an angled shank 12 which is mounted on a universal joint 13 which is oriented in the x-y coordinate direction and can be moved in the z-direction. The origin of the coordinate system is located at the center point of the universal joint 13. The deflection of the probe ball 15 at the free end of the probe pin 11 comprises the rotational movement $\phi_x$ about the x-axis, the rotational movement $\phi_y$ about the y-axis, and the linear movement v of the joint center (the center point of the joint 13) in the z-direction. The force required for deflection is in this case ignored.

Assuming a restriction to small rotation angles and the simplification of this resulting of sin $\phi \approx \phi$ and cos $\phi \approx 1$, the vector a of the deflection is given by:

$$a = a_{rot} + a_v = \vec{\phi} \times \vec{l} + v \quad (1)$$

where $a_{rot}$ is the rotational component of the deflection vector and $a_v$ is the linear component of the deflection vector in the z-direction. $\vec{l}$ denotes the locus vector of the center point of the probe ball 15.

FIG. 1 also shows three measured value transmitters 16, 17, 18 of the probe (in this case of the probe pin 11), which produce measurement signals u1, u2, u3. In this case, the measurement signal u1 corresponds to the rotation of the probe pin about the rotation point of the universal joint about the x-axis, the measurement signal u2 corresponds to the rotation of the probe pin about the rotation point of the universal joint about the y-axis, and u3 corresponds to the linear movement of the joint center in the z-direction.

This model is only an example. For example, it can be generalized by also allowing rotation about the z-axis.

The probe pin is constrained flexibly (that is to say elastically), both rotationally and translationally, at the joint center. In each case, the probe is deflected by a measurement force f (alternatively referred to as the probe force) acting on the probe ball 15. In this case, its direction within the friction angle is defined by the normal to the probed surface of the workpiece. The deflection a of the probe ball is the consequence of the elastic rotational and translational flexibility of the probe suspension, and the physical bending of the probe pin.

A model can be derived in the axis orientation, on the assumption of the ideal case of an orthogonal system. In this case, for the special case of blocked axes as explained with reference to FIG. 1 (rotation about the z-axis and linear movement in the x- and y-direction are blocked), finite stiffness can be assumed for these axes (that is to say for the corresponding degrees of freedom of movement), and a general linearly elastic system can therefore be introduced.

The force vector f acting on the universal joint results in a three-dimensional linear movement vector v, which is produced as a linear map by means of the symmetrical flexibility matrix $N_k$:

$$v = N_k f \quad (2)$$

The linear movement $a_t$ of the probe ball resulting from the bending of the probe pin is added to the deflection resulting from the bearing in the elastic universal joint, which bending can be described in the same manner by means of a flexibility matrix $N_f$ such that, in an entirely general form:

$$a = a_{rot} + a_v + a_t = N_{tot} f \quad (3)$$

where $N_{tot}$ is the overall flexibility matrix, which takes account of the rotational and linear flexibility resulting from rotation and linear movement of the center point of the universal joint, and the bending of the probe pin.

Since the force vector f plays only a medium role for the entire transfer of the deflection a to the measurement signal u (which is composed of the signals u1, u2, u3 in the example mentioned above), this can be eliminated for the derivation of the probe equation.

$$a = Hu \quad (4)$$

where H is the transmission matrix. As a simple special case, a probe can be considered having axis-oriented elastic characteristics and negligible probe bending, for which the following conditions apply:

1. The flexibility matrix $N_k$ is in diagonal form. 2. The rotational flexibility matrix, which describes the rotational flexibility in the joint 13, is in diagonal form. 3. The probe has infinite bending stiffness.

The transmission matrix $H_0$ for this simple case is as follows:

$$H = H_0 = \begin{pmatrix} 0 & \frac{l_z}{k_2} & 0 \\ -\frac{l_z}{k_1} & 0 & 0 \\ \frac{l_y}{k_1} & \frac{l_x}{k_2} & \frac{1}{k_3} \end{pmatrix} \quad (5)$$

As a conclusion for the general case, it can be stated that, for small deflections, the probe can be considered to be a linear system with a fully occupied transmission matrix H. The matrix H contains all the transmission characteristics which result from the elastic coefficients for rotation and linear movement of the universal joint, from the bending of the probe pin, whatever its shape, from any residual discrepancies from the orthogonality of the probe axes, and from the installation position of the probe head. With the exception for the plane z=0, the matrix H is regular and provides a reversibly unique image of the signal and deflection vector. This therefore results in the preconditions for calibration of the probe by determination of the nine matrix coefficients.

The assessment of the response and the movement of the probe ball when probing any surface which is oriented in space are of importance for practical measurement and in particular when using a probe for scanning on a predetermined section plane. The measurement force which is established is also of interest. The answer to these questions is provided by analysis of the influencing or flexibility ellipsoid, which is described by the flexibility matrix $N_{tot}$ (see above for the special case, as described there of a probe having a universal joint and blocked degrees of freedom of movement), and describes the relationship between the force and the deflection for the center point of the probe ball (see also equation 3).

In the case of a central probe for which $I_x = I_y = 0$ (i.e. in the special case as shown in FIG. 1, as described above, the probe pin extends exactly in the z-direction when not stressed), this results in an illustration, in that the elements on the main diagonal cover the flexibility in the axis directions, and at the same time the half-axes of the flexibility ellipsoid:

$$N_{tot} = \begin{pmatrix} \phi_y l_z^2 & 0 & 0 \\ 0 & \phi_y l_z^2 & 0 \\ 0 & 0 & n_z \end{pmatrix} \quad (6)$$

The lateral flexibility increases with the square of the probe pin length $l_z$ as it increases, while in contrast the flexibility in the z-direction remains constant.

For the general case of a probe pin aligned in an undefined manner relative to the elastically moving parts of the probe (for example with an angled probe pin, see FIG. 7), the major axis directions of the flexibility ellipsoid are obtained in space as Eigen vectors, and the associated flexibilities as Eigen values of the present flexibility matrix $N_{tot}$. By way of example, a probe with an angled probe pin is annotated with the reference symbol 33 in FIG. 3. The flexibility ellipsoid for a probe such as this is annotated by way of example with the reference symbol 21 in FIG. 2, but rotated through 180°, and for clarity only two-dimensionally as an ellipse.

Figure 2:
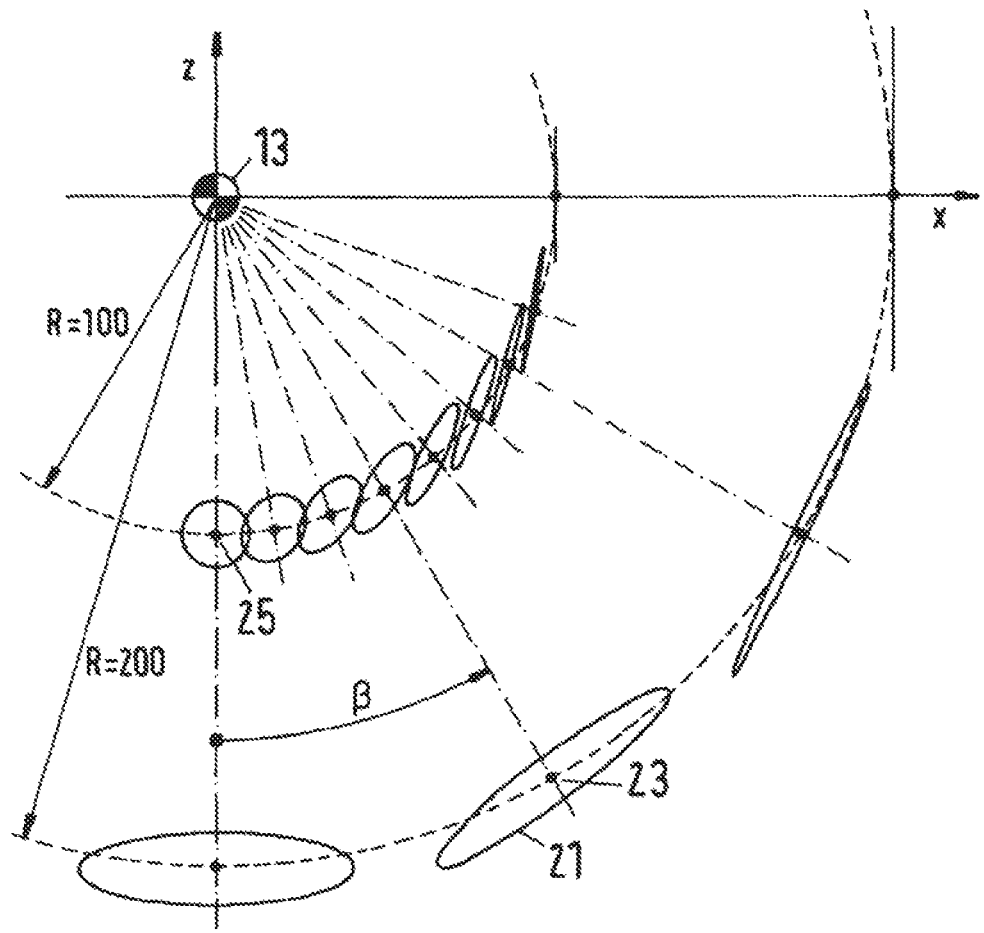
FIG. 2 shows the size and position of flexibility ellipses for one probe type, for two different probe pin lengths.

FIG. 2 shows the flexibility ellipses for the x-z plane at the distances R=100 mm and R=200 from the joint center, and as a function of the angle with respect to the axis. Since the system is rotationally symmetrical, this figure shows the behavior for any undefined plane through the z-axis. The origin of the coordinate system is once again located on the axis of rotation of the joint 13. For the situation where R=200, one of the flexibility ellipses is annotated with the reference symbol 21. The corresponding locus 23, at which the center point of the probe ball is located, is located at the center of this ellipse 21.

For the situation where R=100 and when the locus of the center point of the probe ball is located on the z-axis, the ellipse is virtually circular. This locus 25 is the design point, that is to say the probe is not directionally independent. For this situation, the flexibility ellipsoid is in the form of a sphere. When the locus at the center point of the probe ball lies on the x-axis, the ellipse is a line.

For probe ball loci that are not on the axis, this results in an ellipse whose large major axis is approximately tangential to the circle around the joint 13. The small half-axis (flexibility) decreases very quickly with the angle $\beta$ (that is to say with the angle between the probe pin longitudinal axis and the z-axis). The probe will no longer operate along the x-axis (x-y plane) and deflection is no longer possible. This situation occurs when the axis ratio of the flexibility ellipse becomes greater.

Determination of the flexibility matrix from measurement points during the calibration:

One example of the determination of the flexibility matrix from the measurement data on a calibration body (for example a sphere) will be described in the following text with reference to FIG. 3. In this case, the associated probe force is in each case required for a number of probe points on the calibration ball. In particular, the flexibility matrix (in general, not only in this exemplary embodiment) can also be calculated from the same measurement points as those which have to be probed for sensor calibration.

For individual probe points, the deflection of the probe element from its rest position is provided with open-loop and/or closed-loop control at a predetermined magnitude (for example 100 μm) by the control system of the coordinate measuring device. The predetermined magnitude is preferably chosen such that it is not reached during movement of the probe without probing an object (for example deflections of only about 10 μm are reached when a probe is being moved to the probe location). It is therefore known that the force vector is within the (static) friction cone for every point. The flexibility matrix can be calculated from the deflections from a number n of probed points. FIG. 3 shows a calibration ball 31 and a probe 33 which has an angled probe pin at whose free end a probe ball 35 is located as the probe element. A universal joint 37, which allows deflection of the probe 33, is indicated schematically at the top on the right. Furthermore, the associated deflection vectors 38a, 38b, 38c are shown for just three probe points. In this case, the probed points are located at the start of the respective arrow 38. The illustration relating to the deflection vectors 38 should be understood as being schematic. In practice, the deflection is considerably smaller. Furthermore, in practice, a considerably greater number of surface points are typically probed.

Figure 3:
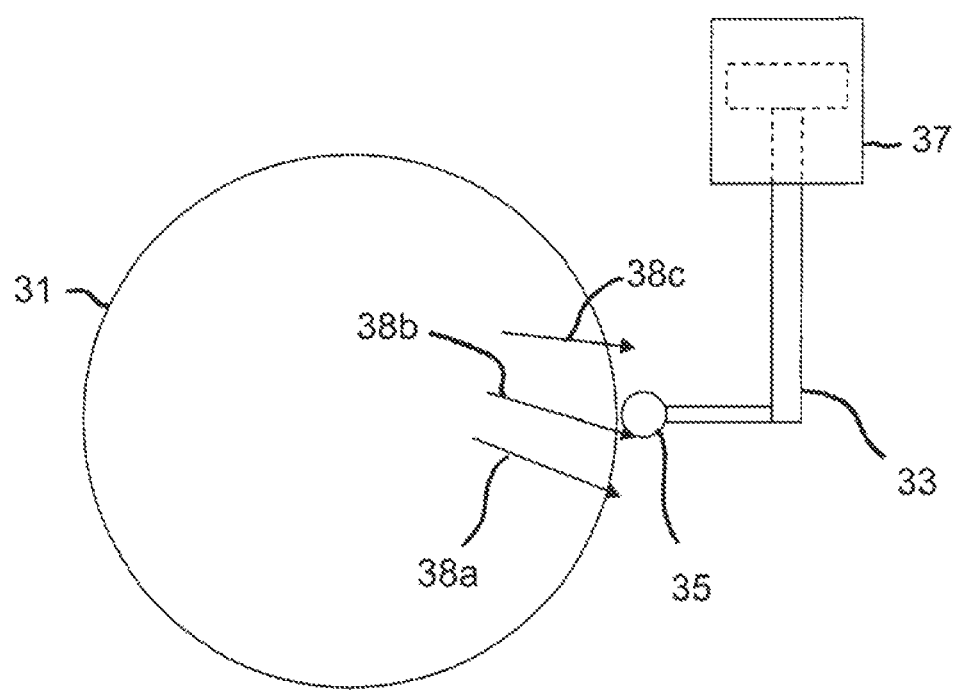
FIG. 3 shows an arrangement with a calibration ball and a probe, schematically illustrating a deflection vector in each case for a number of probe points on the surface of the calibration ball.

For every probe point in FIG. 3, it can be said that the probe deflection a is equal to the flexibility matrix N multiplied by the probe force f (see above, equation 3). The direction of the force f for every probe point can be assumed to be radial with respect to the calibration ball center point, that is to say can be assumed to be normal to the surface. A flexibility matrix N can thus be found by so-called best fit calculation, allowing the optimum probe direction to be determined for each normal to the surface. In this case, it is preferable to use a multiplicity of measurement points, for example a number of more than 50, for example more than 100, measurement points.

In this case, it should be noted that the magnitude of the force is not known exactly—only the direction can therefore be determined.

Since the measurement force has been assumed to be normal with respect to the surface of the sphere, the flexibility matrix N is determined only approximately. The determination of the flexibility matrix can now be repeated by once again probing a plurality of points on the surface of the sphere, with the flexibility matrix which has already been determined being used to determine the coordinates of the measurement points and/or to determine the respective deflection vector, for example by the control system for the coordinate measuring device. In this case, it is therefore no longer assumed that the measurement force is aligned at right angles to the surface. An improved flexibility matrix can then be calculated. This procedure can be iterated further.

As an alternative to the procedure described above, it is possible to use a matrix which has been determined in a different manner, for example by means of an earlier calibration and/or by means of a model calculation, as a first approximation to the flexibility matrix (that is to say for the first iteration step).

If the measurement data has been recorded using the scanning method, then is should be noted that the scanning lines are in the ideal case driven forward and backward with exactly the same nominal deflections and forces. As a substitute, it is also possible to scan forward and backward with similar forces (forces can be defined as being "similar" when the difference is less than a predetermined limit value). Otherwise (if the forces are not similar), systematic errors result in the calculation of the flexibility matrix (for example because of hysteresis effects). This also applies to the determination of other calibration parameters of a probe.

In the method described above for determining the flexibility matrix, the residual error depends on the friction cone angle, that is to say on the angle between the center axis of the friction cone and the normal. In order to reduce this error, the alignment of the center axis of the friction cone can be determined via the probe element sliding on the surface of the workpiece (in this case: the calibration ball). This method is expediently not carried out for every probe point in the sensor calibration, but selectively only at a small number of probe points. Alternatively, additional measurement points can be recorded, independently of the actual sensor calibration, in a separate measurement process. For this purpose, after each probing process, the probe element is moved by the coordinate measuring device in at least four directions for each probe point (in this case, two directions may in each case be mutually opposite directions). The deflection at which the probe element slides away can be determined by detection and preferably also recording of the sensor deflection, and of the position determined by the coordinate measuring device. In this case, by way of example, a time is detected at which the sensor deflection decreases suddenly. The deflection immediately before the sudden decrease can be used as the maximum deflection in the respective movement direction at which it starts to slide away. The direction of the center axis of the friction cone can be determined from the points determined in this way in the at least four directions. In particular, the center axis is inclined with respect to the normal to the surface (in comparison to the opposite direction) in that direction along the surface in which it subsequently slides through during movement of the probe element (that is to say at a greater distance from the originally probed surface point).

The optimum sensor deflection (that is to say the direction of the deflection vector when the probe force is at right angles to the surface) can therefore be determined for example by centroid calculation of all the maximum deflections or by calculation of the intersection point of the connecting lines between the maximum deflections.

Figure 5:
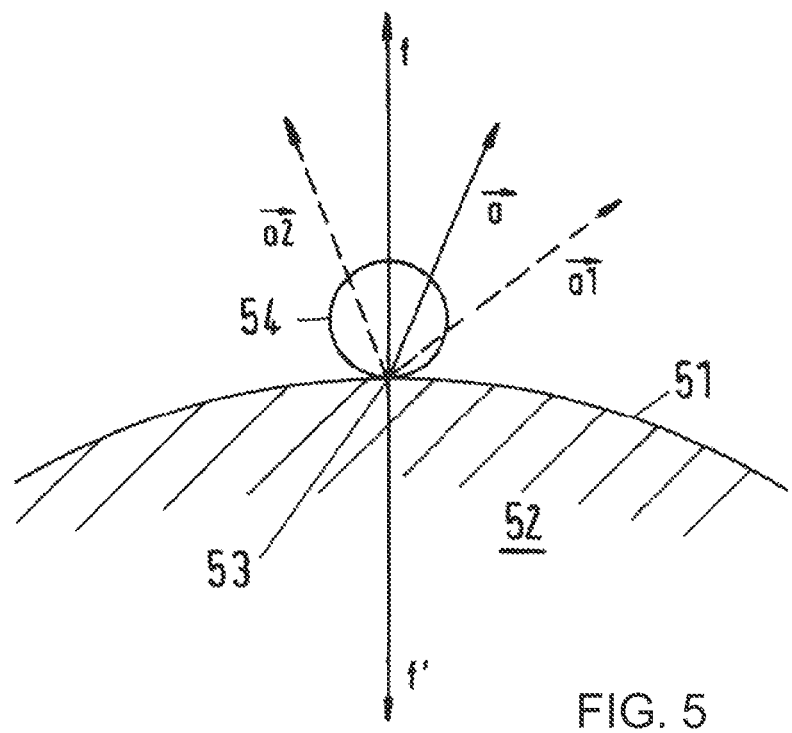
FIG. 5 shows a plane on which the deflection of the probe is changed when a probe ball is used to probe a workpiece surface, until the ball slides on the surface.

FIG. 5 shows an area of a surface 51 of a workpiece 52. The probe element 54 of a probe is resting on a probe point 53 on the surface 51. In the illustrated example, the probe element 54 is a probe ball. Further components of the probe, in particular a shank of a probe pin, to whose free end the probe ball 54 is attached, are omitted in order to make the illustration clear.

The probe ball 54 exerts a probe force f' on the surface 51. The opposing force f, which the surface 51 correspondingly exerts on the probe ball 54, is likewise shown. In the situation illustrated here, the opposing force f is aligned at right angles to the surface 51, that is to say the probe force f' is exerted in a optimum manner on the surface 51. The probe ball cannot slide on the surface 51.

Because of the direction dependency of the flexibility of the probe, the deflection a, which corresponds to the probe force f', and which is a vector (represented by a vector arrow in FIG. 5), is oriented in a different direction than the perpendicular to the surface.

In order to determine the direction of the optimum deflection vector, which corresponds to the optimum alignment of the probe force f', the deflection is varied. For this purpose, the probe point 53 is initially probed in any desired direction of the deflection, but is preferably aligned approximately at right angles to the surface or is aligned at an angle to the normal on the basis of a previous estimate. In this case, a probe force which is exerted on the surface 51 is generally not at right angles to the surface 51. The direction of the deflection is then changed, with the coordinate measuring device attempting to move the probe element 54 along the surface 51. This is initially not possible, because the static friction prevents this. However, when the deflection leaves the friction cone, the probe ball slides through on the surface 51. This can be detected as described above.

By way of example, the coordinate measuring device attempts to move the probe element 54 along the surface 51, on the one hand to the left and on the other hand to the right in the illustration in FIG. 5 (and preferably also in other directions, for example forward and backward). During the process, the probe force is applied continuously. The sliding through occurs for the deflection vector a2 during the movement to the left. Sliding through occurs for the deflection vector a1 during the movement to the right. The optimum deflection vector a (at least with respect to the plane of the figure in FIG. 5) is located on the angle bisector between the deflection vectors a1 and a2.

Figure 6:
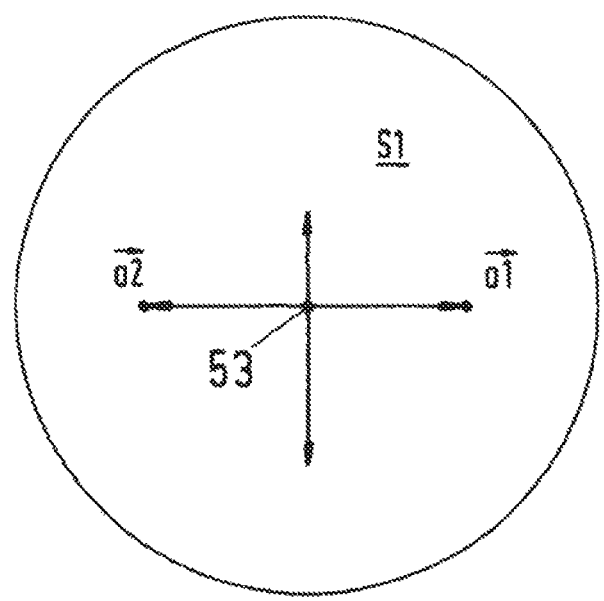
FIG. 6 shows an illustration from above of the situation illustrated in FIG. 5.

FIG. 6 shows the situation illustrated in FIG. 5 from above, but not illustrating the probe ball 54. The four arrows in FIG. 6 illustrate the directions in which the coordinate measuring device attempts to move the probe element, starting from the probe point 53. The tips of the maximum deflection vectors a1 and a2 are represented by a small solid circle in FIG. 6.

In particular, as an alternative to the method described above for determining the flexibility matrix with a plurality of iteration steps, it is possible to carry out only the 1$^{st}$ iteration step and to use the direction of the sensor deflection determined by sliding through for each probe point, thus making the determination of the flexibility matrix more accurate.

Figure 7:
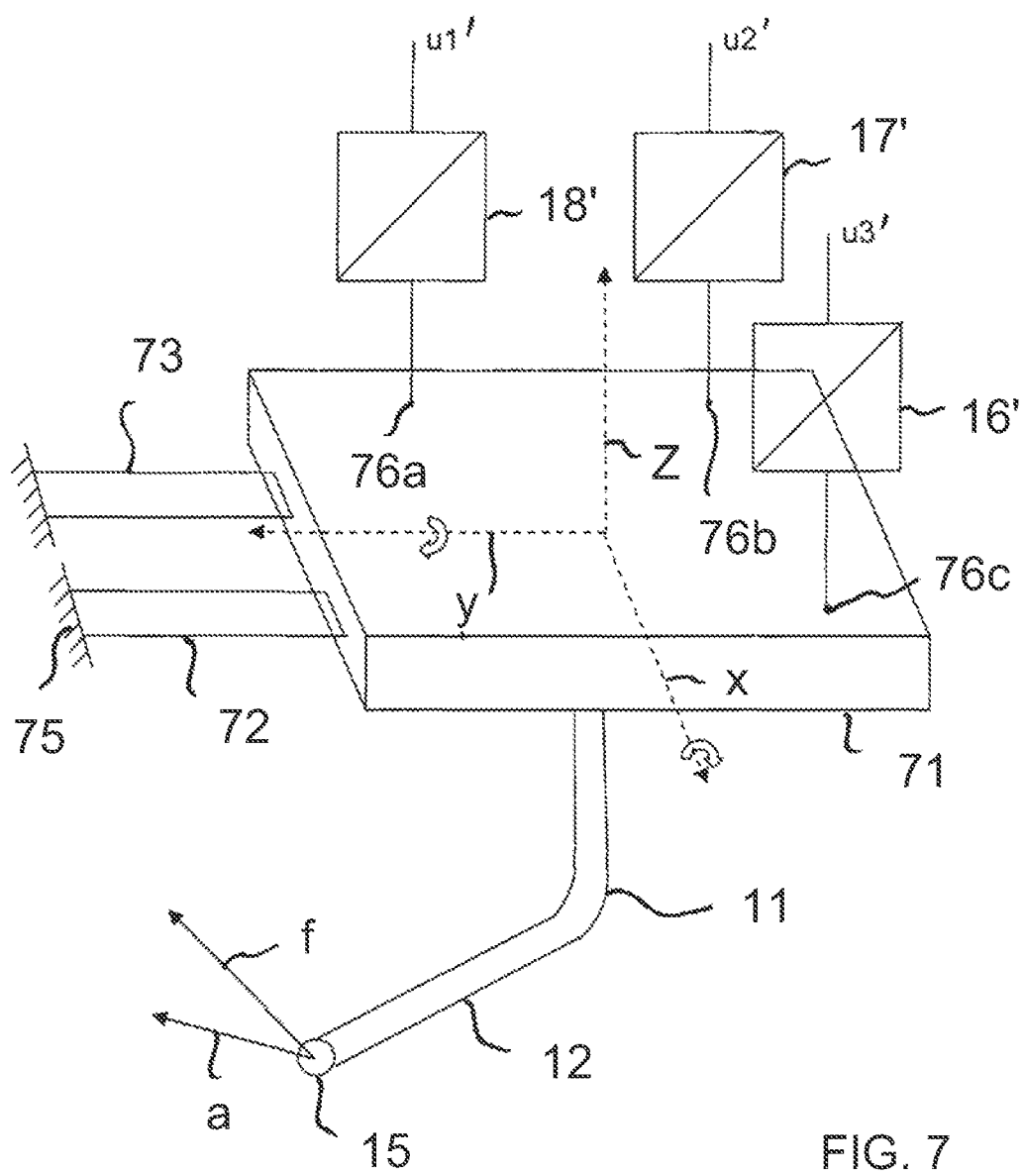
FIG. 7 shows a probe with two rotational degrees of freedom and one linear degree of freedom of movement.

The determination of the flexibility matrix by sliding through, can be carried out before calibration. However, in this case, it should be noted that the sensor matrix is in general not yet known exactly at this time. This results in a systematic error in the determination of the flexibility matrix, which is not negligible, particularly in the case of universal joints and poor probe geometries. The sensor matrix (also referred to as the transmission matrix, see above), means a matrix by means of which sensor deflections can be calculated which have been corrected (in particular converted to metric Cartesian coordinates) from (uncorrected, that is to say produced by the measured value transmitters 16', 17', 18' as shown in FIG. 7) sensor deflection signals. The calculation of this matrix is therefore an important part of the calibration of such sensors. In addition, further calibration parameters may possibly be calculated.

In order to allow the sensor deflection to be regulated, taking account of the flexibility matrix, for the purpose of calibration of the sensor matrix during the data recording process itself (in particular recording of the data from which the respective instantaneous position of the probed surface point can be determined), the following procedure is therefore proposed:

1. A good start value for the flexibility matrix is determined at the start of or before the calibration. In the case of probes having at least one rotational degree of freedom (for example in the case of probes having a universal joint), in which the flexibility of the joint is large in comparison to the flexibility of the probe ignoring the joint, there is no need for measurements in this case. In this case, the flexibility matrix can be calculated by transformation of the flexibility ellipsoid to the universal-joint coordinates (that is to say coordinates which have been at least partially related to rotational degrees of freedom), ignoring the flexibility of the probe pin.
2. Sensor calibration by recording of measurement points and determination of the sensor matrix. Details of possible procedures have been described above.
3. After the determination of the sensor matrix, the flexibility matrix is calculated using the sensor matrix, for example by means of the method described above with reference to FIG. 3. However, the sensor matrix is now known, thus making it possible to avoid the residual error mentioned above.

The following problem occurs when probing individual points (that is to say not during scanning), taking account of the flexibility matrix:

The probe point on the surface of the workpiece is in general searched for in the so-called nominal direction (the direction at right angles to the workpiece surface). For this purpose, the coordinate measuring device moves the probe element (in particular the probe ball) from an initial position (for example the so-called search position at a defined probe search distance from the surface of the workpiece) vertically toward the nominal probe point (for example the probe point determined from CAD data). As soon as the magnitude of the measurement force and/or the sensor deflection has exceeded a defined threshold, a measurement point is transferred, that is to say it is identified as a valid measurement point. The position of the probe element produced by the coordinate measuring device, and the probe deflection, can be used directly to determine the coordinates of the measurement point.

Alternatively or additionally a defined deflection or measurement force can be set, that is to say the probe is moved by the coordinate measuring device so as to set a deflection or measurement force whose magnitude, and optionally also whose direction, are predetermined, when probing the surface point. In this case, the deflection or measurement force can be regulated, that is to say it is reduced again, for example in the event of the nominal variable being exceeded, or in more general terms, discrepancies from the nominal value, and optionally the nominal direction, are regulated out.

This method necessarily results in the problem that the coordinate measuring device is not regulated in force vector space until said threshold is reached, or the nominal value is reached for the first time. In the event of poor probe geometries, the probe element (for example the probe ball) may have already left the friction cone, that is to say it may already have slid away. One major reason for this is that, until the nominal value or said threshold is reached for the first time, regulation cannot be carried out in force vector space, because deflections can also result during movement of the probe without probing an object, that is to say as a result of oscillations or vibrations. Since the deflections are generally very small even when probing a workpiece, for example in the order of magnitude 100 μm, an order of magnitude of 10 μm can be expected, at least in the case of deflections without objects being probed.

Figure 4:
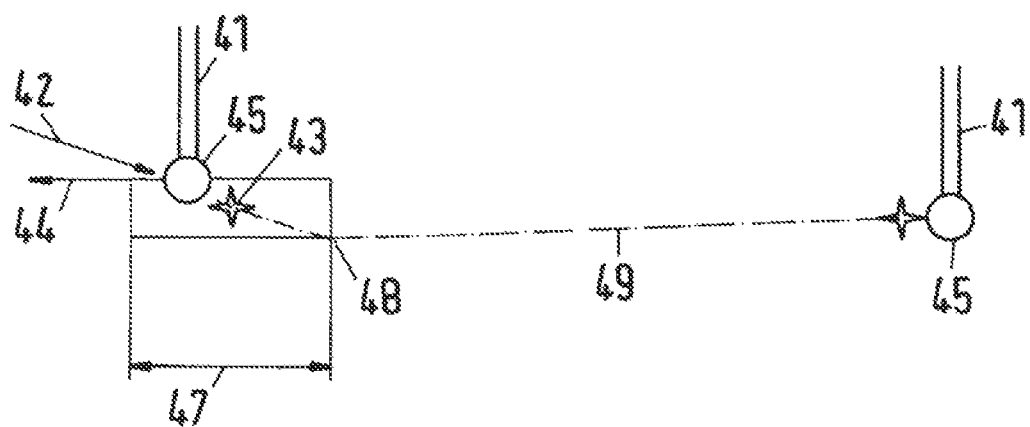
FIG. 4 shows a probe process, in which the probe element of a probe is first of all moved in a first direction, and the direction in which the probe element is moved is then changed taking account of the direction-dependent flexibility.

The following procedure is therefore proposed. The following description refers to FIG. 4. In the figure, the probe pin is annotated 41, and the probe element (in this case a probe ball) is annotated 45:

1. By way of example, the search position 45 and the nominal probe point 43 are transferred to the control system for the coordinate measuring device from a preferably computer-controlled process (for example produced by learning programming and/or generated from a CNC, computer numerical control model), or the control system is itself able to determine the search position and the nominal probe point.
2. A regulation area 47 around the nominal probe point 43 is calculated from a regulation search window, which is dependent on the permissible workpiece dimension tolerance, on the type of coordinate measuring device, and/or on the probe type.
3. A start point 48 for the regulation is calculated for the probe element such that the movement direction from this start point to the nominal probe point 43 for contact with the surface of the workpiece results in a measurement force (probe force) at right angles to the surface of the workpiece. The flexibility matrix is used for this purpose. According to equation (3), the deflection vector can be calculated from the flexibility matrix, by multiplying the matrix by the force vector at right angles to the surface of the workpiece.
4. The coordinate measuring device moves the probe element 45 from the search position 45, for example at a predetermined probe search rate, in a straight line to the calculated start point 48 for regulation.
5. From the start point 48 for regulation, the coordinate measuring device moves the probe element 45 such that, during the probing process, the measurement force 44 is at right angles to the workpiece surface. When the probe element 45 is in the position illustrated in the left-hand part of FIG. 4, the probe element 45 is in contact with the workpiece surface (this is not illustrated.
6. If the actual probe point (nominal point and actual point may differ considerably from one another in the event of significant manufacturing defects) is not within the regulation search window 47, the actual probe point is transferred as a new nominal probe point and the probing process is repeated.

The regulation search window is preferably selected such that it is small in relation to the probe search movement 49.

In some applications, spatial points are calculated by the evaluation device of the coordinate measuring device (which determines the positions of the probed surface points) such that even minor discrepancies, which are tangential with respect to the surface of the workpiece, between the actual measurement points and the nominal points, lead to evaluation errors. In the case of small regulation search windows and little workpiece surface curvature, the actual probe point may be shifted by projection such that it has no tangential discrepancy. This method is included in many evaluation software packets and can be used in a preferred form here.

A further preference of the method described is that, if the ratio of the probe search movement to the regulation search window is good (high), the path actually moved on by the probe element will have only minor discrepancies from the path calculated in advance. This is advantageous in order to separate the path calculation from the flexibility matrices of the various sensors (probes), that is to say the path can be calculated independently of which sensor is used to measure the workpiece: the intermediate positions—in this case the search position—are frequently calculated using a CAD model. The CAD model may also include collision protection evaluation (see above, that is to say avoidance of incorrect association between the nominal and the actual probe point). If the control system for the coordinate measuring device receives, for example, only the information about the search position and the nominal probe point from the CAD model, the flexibility matrix need be considered only in the control system, but not in the CAD model.

FIG. 7 shows one specific embodiment of the probe which is illustrated schematically in FIG. 1. Two leaf springs 72, 73, which are arranged at a distance from one another and parallel to one another, are fitted to a holder 75, which is attached to a coordinate measuring device or to a sleeve, for example by means of a housing of the probe or by means of an attachment for attaching the probe to an arm of the coordinate measuring device. The leaf springs 72, 73 are connected to a platform 71 at the opposite ends to the attachment 75. The angled probe pin 11 is attached to the underneath of the platform 71 in the center of the platform 71. The y-axis runs on the center line between the two leaf springs 72, 73. That part of the shank 12 of the probe pin 11 which is attached to the platform 71 extends in the z-direction.

Because the leaf springs 72, 73 can move upward and downward (that is to say in the z-direction), but the leaf springs cannot be lengthened in their longitudinal direction, the platform and therefore the probe pin 11 in this case rotate about a rotation axis which runs parallel to the x-axis and can be described by a superimposition of rotation about the x-axis and linear movement in the z-direction. Furthermore, the platform can rotate about the y-axis when that end of the leaf spring 73 which is attached to the platform 71 is moved upward, and the end of the leaf spring 72 is at the same time moved downward, or vice versa.

A probe ball 15 is located at the free end of the probe pin 11. The force vector f and the deflection vector a are illustrated schematically. Their directions do not coincide because the elasticity of the probe is direction-dependent, as described. In particular, rotation about the z-axis is blocked, that is to say it is impossible. Linear movement in the y-direction is likewise blocked.

The sensors 16', 17', 18' which are used for detection of possible movements of the platform 71, and therefore of the probe 11, are represented by squares with a diagonal line, in a similar manner to that in FIG. 1. They act on the upper face of the platform 71, at the points annotated 76a, 76b, 76c. It these points are moved in the z-direction, this is detected by the sensors, and corresponding measurement signals u1', u2', u3' are generated. These measurement signals can be converted to the measurement signals of the sensors 16, 17, 18 as shown in FIG. 1. This example shows that only measured value transmitters which detect a linear movement can be used even for probes with rotational degrees of freedom of movement.

The invention claimed is:

1. A coordinate measuring device, comprising:
a probe; and
a controller for controlling a method for measuring a workpiece, said controller:
   controlling said probe to probe at least one point on a surface of the workpiece, said probe exerting a probe force on the surface of the workpiece and said probe is deflected relative to an attachment of said probe;
   determining a position of the point on the surface on a basis of a deflection of said probe;
   determining a direction-dependency of flexibility of said probe prior to measuring the workpiece;
   in order to measure the workpiece, performing at least one of positioning or aligning said probe and the workpiece relative to one another, taking into account the direction-dependency, wherein a deflection direction of said probe and a direction of the probe force being different, such that said probe does not inadvertently slide on the surface when probing the point on the surface, or said probe does not inadvertently depart from an intended path on the surface.

2. A coordinate measuring device, comprising:
a probe; and
a controller for controlling a method for measuring a workpiece, said controller:
controlling said probe to probe at least one point on a surface of the workpiece, said probe exerting a probe force on the surface and said probe being deflected relative to an attachment of said probe;
determining a position of the point on the surface on a basis of a deflection of said probe;
determining a direction-dependency of flexibility of said probe prior to measuring the workpiece;
using the direction-dependency to calculate a deflection direction in which said probe will be deflected while probing the surface and while said probe exerts the probe force on the workpiece, wherein the deflection direction and a direction of the probe force being different;
in order to probe the surface, moving said probe first toward the surface, at right angles to the surface;
subsequently performing one of:
   moving said probe to the surface in an opposite direction to the deflection direction; or
   if said probe has already been moved at right angles as far as the surface, deflecting said probe in the deflection direction.

3. A coordinate measuring device, comprising:
a probe; and
a controller for controlling a method for measuring a workpiece, said controller:
   controlling said probe to probe at least one point on a surface of the workpiece, said probe exerting a probe force on the surface and said probe being deflected relative to an attachment of said probe, wherein a deflection direction and a direction of the probe force being different;
   determining a position of the point on the surface on a basis of a deflection of said probe; and
   calculating the probe force from the deflection, taking into account a direction-dependent flexibility of said probe determined or already known prior to measuring the workpiece, and using the probe force as an open-loop or closed-loop controlled variable.

4. A coordinate measuring device, comprising:
a probe; and
a controller for controlling a method for measuring a workpiece, said controller:
   controlling said probe to probe at least one point on a surface of the workpiece, said probe exerting a probe force on the surface of the workpiece and said probe is deflected relative to an attachment of said probe;
   determining a position of the point on the surface on a basis of a deflection of said probe;
   using the direction-dependency of flexibility of said probe that is already known prior to measuring the workpiece;
   in order to measure the workpiece, performing at least one of positioning or aligning said probe and the workpiece relative to one another, taking into account the direction-dependency, wherein a deflection direction of said probe and a direction of the probe force being different, such that said probe does not inadvertently slide on the surface when probing the point on the surface, or said probe does not inadvertently depart from an intended path on the surface.

5. A coordinate measuring device, comprising:
a probe; and
a controller for controlling a method for measuring a workpiece, said controller:
controlling said probe to probe at least one point on a surface of the workpiece, said probe exerting a probe force on the surface and said probe being deflected relative to an attachment of said probe;
determining a position of the point on the surface on a basis of a deflection of said probe;
using the direction-dependency of flexibility of said probe that is already known prior to measuring the workpiece;
using the direction-dependency to calculate a deflection direction in which said probe will be deflected while probing the surface and while said probe exerts the probe force on the workpiece, wherein the deflection direction and a direction of the probe force being different;
in order to probe the surface, moving said probe first toward the surface, at right angles to the surface;
subsequently performing one of:
   moving said probe to the surface in an opposite direction to the deflection direction; or
   if said probe has already been moved at right angles as far as the surface, deflecting said probe in the deflection direction.

6. The coordinate measuring device according to claim 1, wherein said controller controls the positioning or the aligning of said probe and the workpiece relative to one another and includes rotating the workpiece taking into account the direction-dependency.

7. The coordinate measuring device according to claim 1, wherein said controller controls the positioning or the aligning of said probe and the workpiece relative to one another and includes rotating the probe about at least one rotation axis taking into account the direction-dependency.

8. The coordinate measuring device according to claim 1, wherein said controller:

calculates at least one of the positioning or the aligning of said probe and the workpiece relative to one another for the point on the surface of the workpiece taking into account the direction-dependency of the flexibility; and controls a movement device for at least one of moving the workpiece or the probe, such that the positioning or the aligning of said probe and the workpiece relative to one another are maintained while probing.

9. The coordinate measuring device according to claim 1, wherein said controller:

describes the direction-dependency of flexibility at least by values which correspond to major axes of an ellipsoid, and controls aligning the workpiece and the probe relative to one another such that the probe force does not coincide with a direction of a major axis of the ellipsoid which corresponds to a lowest flexibility value.

10. The coordinate measuring device according to claim 1, wherein the direction-dependency of flexibility of the probe is predetermined.

11. The coordinate measuring device according to claim 1, wherein the direction-dependency of flexibility of the probe is already known.

12. The coordinate measuring device according to claim 2, wherein said controller calculates the deflection direction such that the probe force is at right angles to the surface.

13. The coordinate measuring device according to claim 4, wherein said controller controls the positioning or the aligning of said probe and the workpiece relative to one another and includes rotating the workpiece taking into account the direction-dependency.

14. The coordinate measuring device according to claim 4, wherein said controller controls the positioning or the aligning of said probe and the workpiece relative to one another and includes rotating the probe about at least one rotation axis taking into account the direction-dependency.

15. The coordinate measuring device according to claim 4, wherein said controller:

calculates at least one of the positioning or the aligning of said probe and the workpiece relative to one another for the point on the surface of the workpiece taking into account the direction-dependency of the flexibility; and controls a movement device for at least one of moving the workpiece or the probe, such that the positioning or the aligning of said probe and the workpiece relative to one another are maintained while probing.

16. The coordinate measuring device according to claim 4, wherein said controller:

describes the direction-dependency of flexibility at least by values which correspond to major axes of an ellipsoid, and controls aligning the workpiece and the probe relative to one another such that the probe force does not coincide with a direction of a major axis of the ellipsoid which corresponds to a lowest flexibility value.

17. The coordinate measuring device according to claim 4, wherein the direction-dependency of flexibility of the probe is predetermined.

18. The coordinate measuring device according to claim 4, wherein the direction-dependency of flexibility of the probe is already known.

19. The coordinate measuring device according to claim 5, wherein said controller calculates the deflection direction such that the probe force is at right angles to the surface.

* * * * *